March 25, 1969  T. C. GERNER  3,434,763
PIVOTAL CONNECTION FOR IDLER ARMS
Filed March 9, 1967
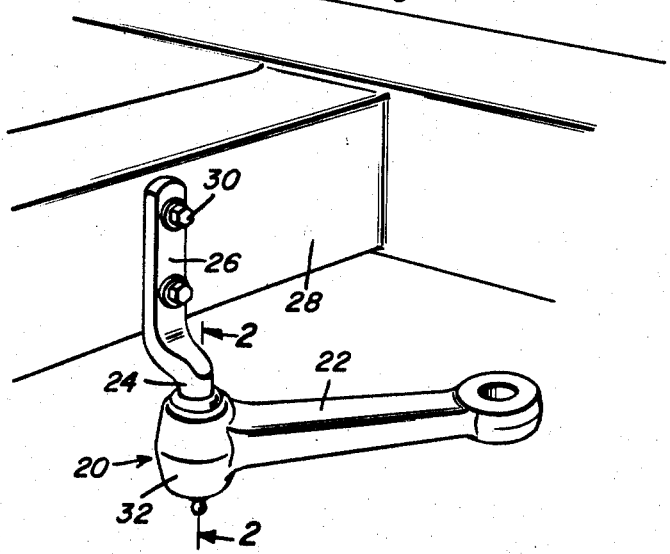
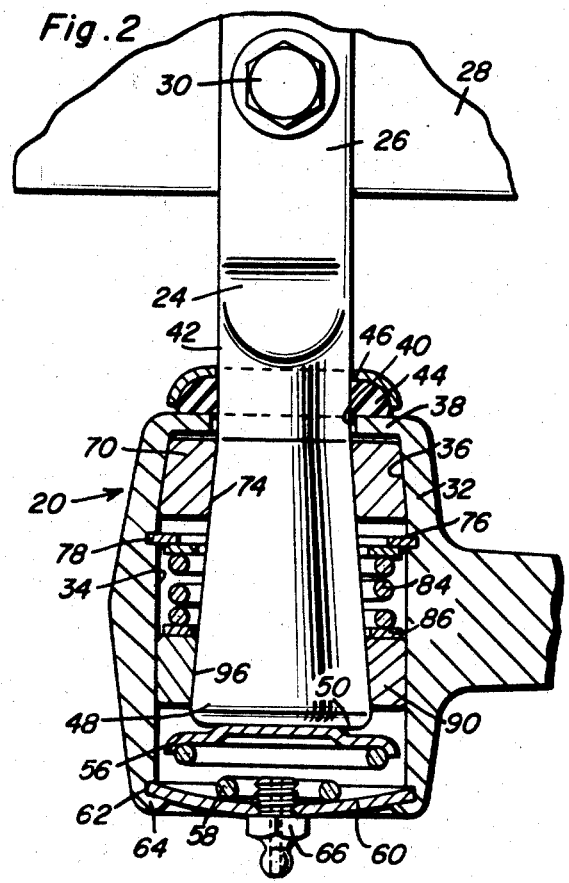
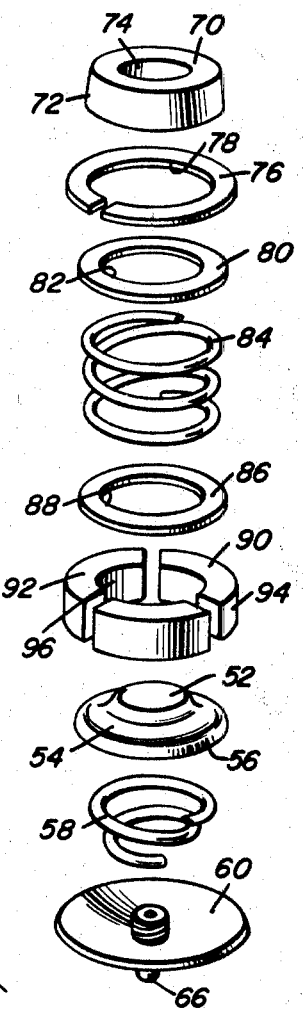
Theodore C. Gerner
INVENTOR.

March 25, 1969 T. C. GERNER 3,434,763
PIVOTAL CONNECTION FOR IDLER ARMS
Filed March 9, 1967 Sheet 2 of 4
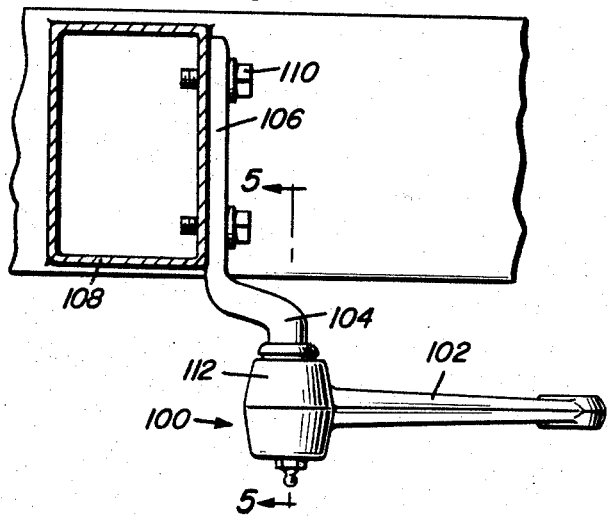
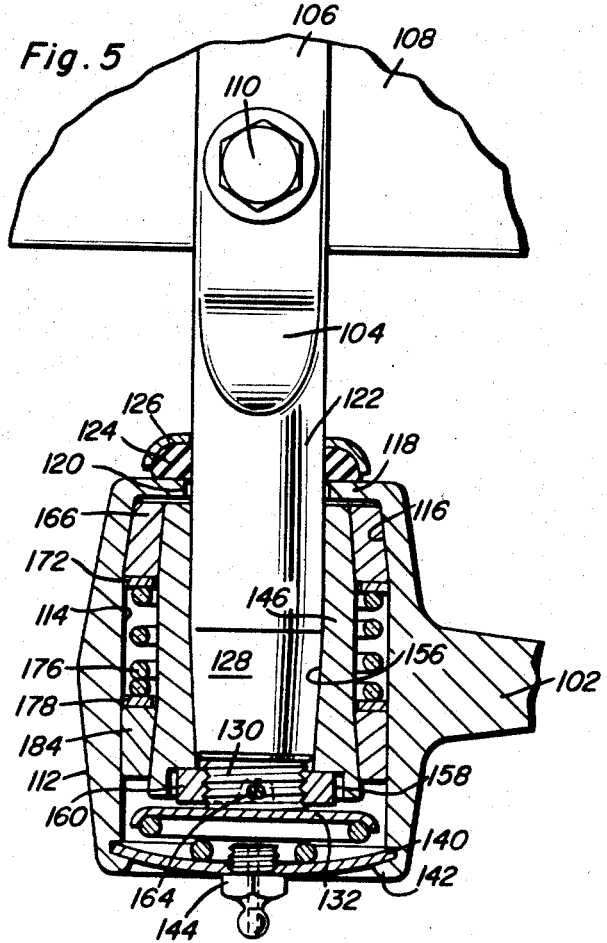
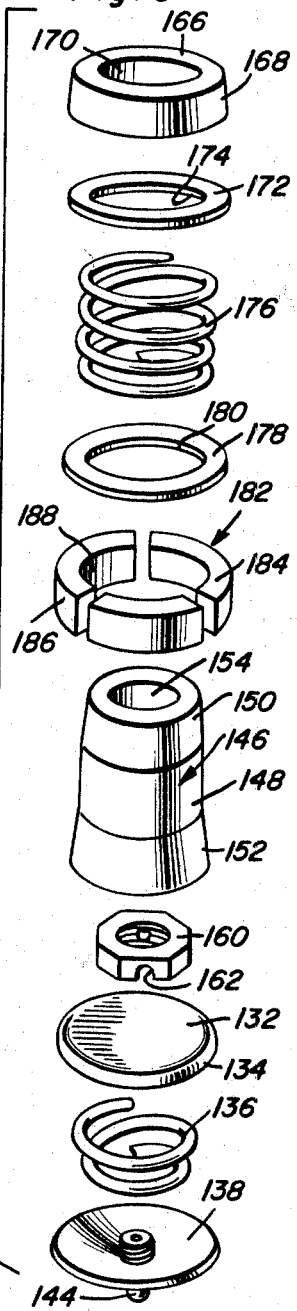
Theodore C. Gerner
INVENTOR.

March 25, 1969  T. C. GERNER  3,434,763
PIVOTAL CONNECTION FOR IDLER ARMS
Filed March 9, 1967  Sheet 3 of 4
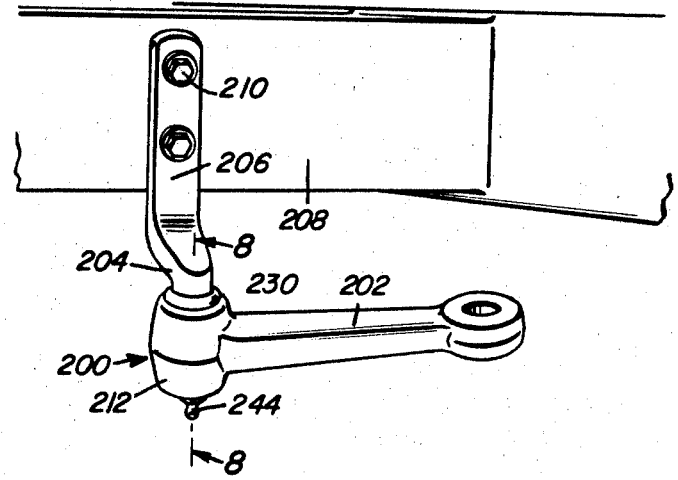
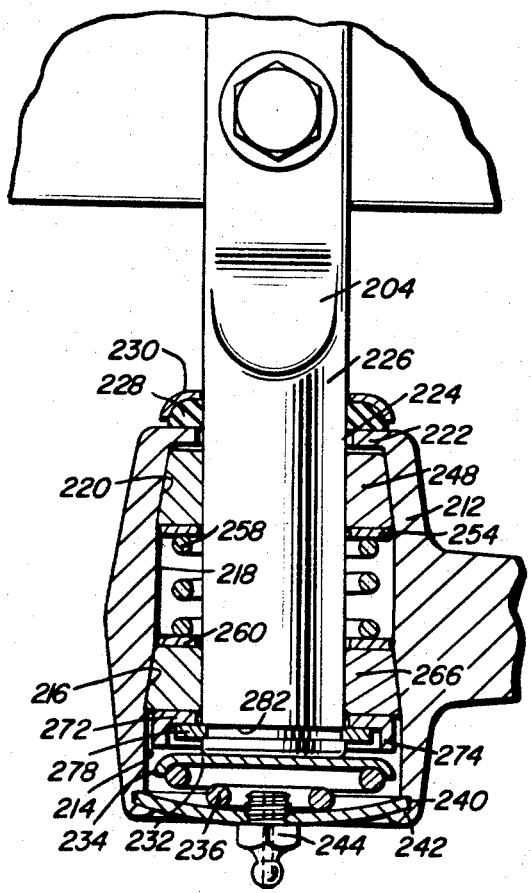
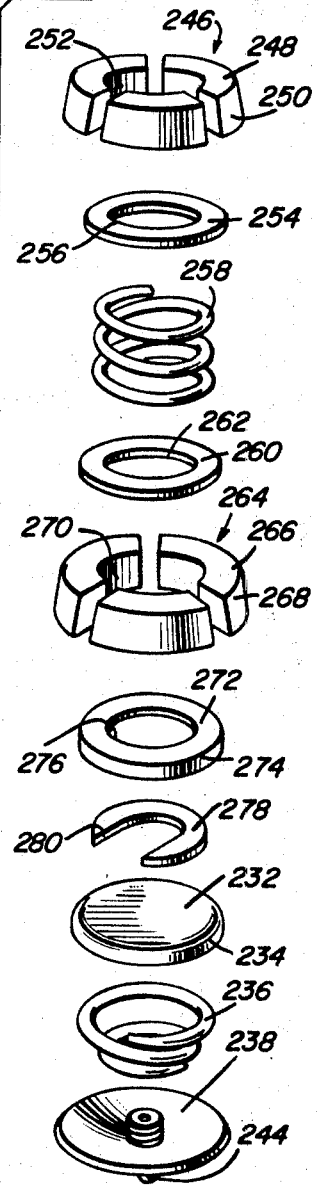
Theodore C. Gerner
INVENTOR.

March 25, 1969 T. C. GERNER 3,434,763
PIVOTAL CONNECTION FOR IDLER ARMS
Filed March 9, 1967

Theodore C. Gerner
INVENTOR.

BY Thomas A. O'Brien
and Harvey B. Jackson
Attorneys

United States Patent Office 3,434,763
Patented Mar. 25, 1969

3,434,763
PIVOTAL CONNECTION FOR IDLER ARMS
Theodore C. Gerner, 1800 S. Broadway,
Oklahoma City, Okla. 73109
Filed Mar. 9, 1967, Ser. No. 621,821
Int. Cl. F16c 25/00, 11/00; F16d 27/00
U.S. Cl. 308—70    3 Claims

ABSTRACT OF THE DISCLOSURE

A pivotal connection for either the anchor end sometimes referred to as the frame bracket end or the relay end of an idler arm employed in the steering linkage of an automotive vehicle which enables relative movement between the idler arm and either the anchor bracket or connecting pin at the relay end of the idler arm which includes structure for automatically compensating for wear and enabling the components to shift or move slightly under impact forces or shock forces and immediately return to their original position thereby maintaining zero clearance especially on the frame bracket end or anchor end of the idler arm to prevent any possibility of up and down play occurring at this point. Structurally, the pivotal connection includes a spindle or pin received in a bore extending in perpendicular relation to the longitudinal axis of the idler arm with the slack and wear take-up bearing assembly interposed between the spindle or pin and the bore in the idler arm with there being several embodiments of the structure disclosed in which the spindle or pin may be of constant cross-sectional cylindrical configuration or provided with a partial constant cross-sectional configuration and a partial tapering surface in which the tapering surface may either diminish towards the end of the spindle received in the bore or enlarged towards the end of the spindle received in the bore.

---

The pivotal connection disclosed in this application represents certain novel improvements and modifications of the structures disclosed in copending applications Ser. No. 573,730, filed July 8, 1966, for Anchor End Pivotal Connection for Idler Arms, now Pat. No. 3,369,848; Ser. No. 577,537, filed Sept. 6, 1966, for Steering Bushing Assembly. The first-mentioned copending application is a continuation-in-part of Ser. No. 246,631, filed Dec. 21, 1962, for Idler Arm Repair Bushing, now Patent No. 3,273,946, issued Sept. 20, 1966. The second-mentioned application is a continuation of Ser. No. 259,502, filed Feb. 19, 1963, for Steering Bushing Assembly, now abandoned. The structures disclosed in this application also represent improvements in the structures disclosed in prior Patents Nos. 3,180,655, issued Apr. 27, 1965 and 3,044,798, issued July 17, 1962.

An object of the present invention is to provide a pivotal connection for either end of an idler arm in a steering linkage of an automotive vehicle in which the idler arm is provided with an enlarged housing at either or both ends thereof having a bore extending therethrough generally in perpendicular relation to the longitudinal axis of the idler arm. The bore receives one end of a spindle, pin or stud which may be of constant cylindrical cross-sectional configuration or provided with a tapered surface area within the confines of the bore and a bearing assembly is interposed between the inner surface of the bore and the spindle or pin. The bore also is provided with tapering internal surface to coact with the bearing assembly and in certain embodiments, a sleeve engages the spindle or pin and in turn is engaged by the bearing assembly in order to provide accurate and positive journaling support of the pin or spindle in relation to the idler arm and at the same time automatically compensate for any wear which occurs between the components of the pivotal connection but yet permitting limited relative movement between the components by employing resilient structural features incorporated therein to enable small relative movement between the components such as may occur when shock loads are imparted to the steering linkage such as when a vehicle is operated over rough surfaces.

Another object of the invention is to provide a pivotal connection in accordance with the preceding paragraph in which the bearing assembly includes wedge elements resiliently biased and associated with the components of the pivotal connection to enable normal operation of the idler arm and to take up slack and compensate for shock loads. The wedge elements are in some instances a ring-like member while in other instances the ring-like member may be separated into a plurality of segments. Certain of the structural features enable compact structures and retain accuracy for a prolonged period of time.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an idler arm and frame bracket illustrating the relationship therebetween;

FIGURE 2 is a vertical sectional view, on an enlarged scale, taken substantially upon a plane passing along section line 2—2 of FIGURE 1 illustrating the relationship of the structural components of the pivotal connection between the idler arm and frame bracket;

FIGURE 3 is an exploded group perspective view illustrating the structural components of the bearing assembly with the spindle and idler arm housing omitted;

FIGURE 4 is an elevational view of another type of pivotal connection between an idler arm and frame bracket;

FIGURE 5 is a vertical sectional view, on an enlarged scale, taken substantially upon a plane passing along section line 5—5 of FIGURE 4 illustrating the structural details of the pivotal connection illustrated in FIGURE 4;

FIGURE 6 is an exploded group perspective view of the components of the bearing assembly of the pivotal connection illustrated in FIGURES 4 and 5;

FIGURE 7 is a perspective view illustrating another pivotal connection between the idler arm and frame bracket;

FIGURE 8 is a vertical sectional view, on an enlarged scale, taken substantially upon a plane passing along section line 8—8 of FIGURE 7 illustrating the structural details of the pivotal connection;

FIGURE 9 is an exploded group perspective view illustrating the components of the bearing assembly employed in the pivotal connection of FIGURES 7 and 8;

Figure 10:
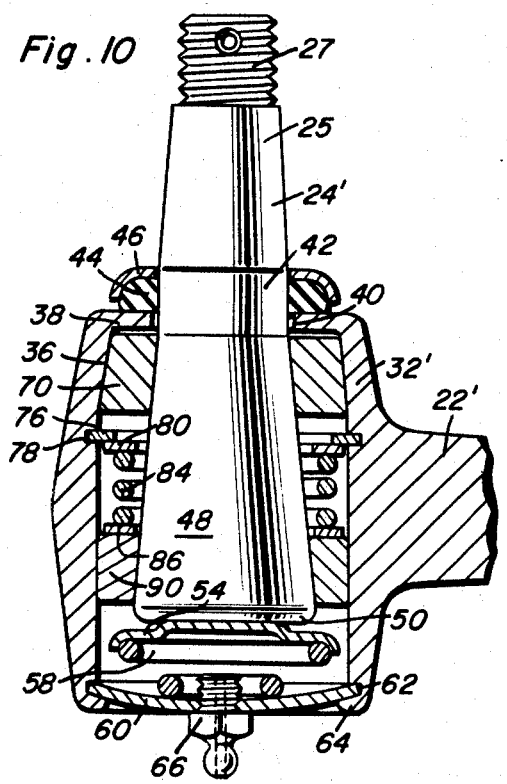
FIGURE 10 is a vertical sectional view illustrating a pivotal connection similar to that in FIGURE 2 but employed in the relay end of an idler arm.

Referring now to FIGURES 1-3 of the drawings, the pivotal connection is generally designated by the numeral 20 and pivotally interconnects an idler arm 22 with the spindle or pin 24 which is integral with and forms the lower end of a frame bracket 26 which forms an anchor for the idler arm 22 and is secured to the component of a vehicle body frame 28 by suitable fastening bolts 30 or the like. The frame bracket 26 pivotally supports the idler arm 22 for relative rotation about an axis defined by the spindle or pin 24 which is substantially perpendicular to the longitudinal axis of the idler arm 22. The anchor end of the idler arm 22 which is sometimes called the frame bracket end is provided with a hollow enlargement or housing 32 having a cylindrical bore 34 extending from the lower end thereof toward the upper end with the upper end portion of the bore tapering inwardly at 36. The upper end of the housing 32 is provided with an inturned lip 38 terminating in an aperture 40 receiving a cylindrical portion 42 of the spindle 24. An annular sealing ring 44 closely encircles the cylindrical portion 42 of the spindle and is retained in sealing relation to the aperture 40 by a retaining cup-shaped metallic washer 46 which may be secured to the spindle 24 in any suitable manner to prevent the entry of foreign material into the interior of the bore 34.

The lower portion of the spindle 24 is outwardly tapered as designated by numeral 48 substantially throughout the length thereof received within the housing 32 with the configuration of the tapered portion 48 being substantially frusto-conical with the lower end of the tapered portion 48 being substantially flat as at 50 which is engaged by the flat central portion 52 of a hollow hat-shaped washer 54 which has a peripheral depending flange 56 which receives and retains the uppermost and largest convolution of a spiral coil spring 58 which has the lowermost convolution seated upon and engaging the inner concave surface of a retaining disk 60 which has the periphery thereof received in a groove 62 in the bore 34 with the portion of the housing 32 outwardly of the groove 62 being rolled or otherwise deformed inwardly as at 64 to lock the retaining disk 60 in place so that the spring 58 is under compression thus biasing the flat portion 52 of the hat-shaped washer 54 against the flat surface 50 of the tapered portion 48 of the spindle 24. A suitable and conventional lubrication fitting 66 extends through the center of the disk 60 by virtue of a screw-threaded connection or the like thereby enabling introduction of lubricant material into the interior of the bore 34 with the disk 60 serving as a closure for the lower end of the bore 34 to not only retain the spring 58 compressed but also to prevent entry of foreign material into the pivotal connection.

Interposed between the tapered portion 48 of the spindle or pin 24 and the bore 34 is a bearing assembly as illustrated in FIGURE 2 and the components of the bearing assembly are illustrated in exploded arrangement in FIGURE 3. This structure includes an upper wedge element or member 70 which may be in the form of a continuous annular member or may be in the form of three segments. The external surface 72 of the upper wedge element 70 is tapered to the same degree of taper as the tapered portion 36 of the bore of the housing 32 as illustrated in FIGURE 2. The internal surface 74 of the upper wedge element whether it be a continuous annular member or three segments is also tapered in substantially the same degree as the external surface of the tapered portion 48 of the spindle 24 as illustrated in FIGURE 2 so that relative movement of the pin 24 and the housing 32 is permitted insofar as upward movement of the housing 32 in relation to the pin 24 is concerned when observing FIGURE 2 but when downward movement of the housing 32 occurs, the inclined surfaces 72 and 74 cooperating with the tapered bore 36 and tapered portion 48 respectively will effectively journal the housing 32 for rotation in relation to the spindle or pin 24 with the relative rotation occurring between the external surface of the tapered portion 48 of the spindle or pin 24 and the upper wedge element 70.

Disposed below and in spaced relation to the upper wedge element 70, a split spring ring or washer 76 is provided which is received in and anchored in a peripheral internal groove 78 disposed in the cylindrical bore 34 spaced below the tapered portion 36 thereof. As illustrated in FIGURE 2, the internal diameter 78 of the split washer 76 is spaced away from the tapered portion 48 of the spindle 24.

Engaged with the undersurface of the split ring or washer 76 which serves as a locking member is an annular washer 80 having an internal diameter 82 greater than the diameter of the tapered portion 48 of the spindle 24. A coil compression spring 84 engages the washer 80 and is spaced from the tapered portion 48. The lower end of the spring 84 is engaged with an annular washer 86 also having an internal diameter 88 slightly greater than the diameter of the tapered portion 48 so that the spring 84 which is under compression may exert a downward force and cause downward movement of the annular washer 86.

Disposed below and engaged by the annular washer 86 is a lower wedge element 90 constructed of three arcuate segments 92 with the external surface of each segment designated by numeral 94 defining a cylindrical surface to slidably engage with the cylindrical bore 34. The internal surface 96 of each segment 92 of the lower wedge element 90 of the bearing assembly is tapered downwardly and outwardly from the top surface thereof in generally the same manner as the tapered portion 48 of the spindle or pin 24 to engage and journal the external surface of the tapered portion 48 of the spindle 24.

In this construction, the lower wedge element 90 must be in three segments and the upper wedge element 70 may either be a single annular member or three arcuate segments and in each instance, the wedge elements define a bearing surface between the external surface of the tapered portion and the wedge elements 70 and 90 respectively. The wedge elements 70 and 90 are preferably constructed of a sintered material such as sintered bronze or the like capable of being impregnated with a lubricant material so that the wedge elements in effect produce a lubricant gusher type of bearing for the rotational movement of the idler arm in relation to the frame bracket.

The spring 84 is a low tension or relatively weak spring since it will serve to retain the lower wedge element segments 92 urged downwardly in relation to the tapered portion 48 of the spindle 24 and in relation to the housing 32 while the spring 58 is a high tension spring or relatively strong spring as compared with the spring 84 since it urges the housing 32 downwardly in relation to the tapered portion 48 of the spindle or pin 24 and the hat-shaped or cup-shaped washer 54 will serve to retain the longitudinal axis of the pin and bore in substantially coincidental relation. Also, it is pointed out that while this embodiment of the pivotal connection is disclosed on the anchor end of an idler arm, the construction can also be employed on the end of the idler arm connected to the cross link of the steering linkage which is generally referred to as the relay end.

FIGURE 10 of the drawings illustrates the pivotal connection 20 employed in the relay end of an idler arm and the same reference numerals are employed except that the idler arm is designated by numeral 22', the housing is designated by numeral 32' and the spindle is designated by numeral 24' in that it is provided with a tapered upper portion 25 having a threaded upper end 27 for connection with the end of a cross link of the steering linkage of an automotive vehicle. Other than this, the reference numerals employed in FIGURE 10 are identical to those employed in FIGURE 2 inasmuch as the structural features thereof are identical.

Referring now specifically to FIGURES 4-6, the pivotal connection of this embodiment of the invention is generally designated by numeral 100 and supports the idler arm 102 for pivotal movement about a vertical axis defined by a spindle or pin 104 having an attaching strap or cleat 106 secured to a component of the vehicle frame 108 by suitable fastening bolts 110 or the like. The idler arm 102 is provided with an integral housing 112 on the end thereof which has a cylindrical bore 114 extending upwardly from the lower end thereof with the upper end portion of the bore 114 being inwardly tapered as at 116. The upper end of the housing 112 is provided with an inturned flange or lip 118 terminating in an opening or aperture 120 for receiving a cylindrical portion 122 of the spindle 104. A sealing ring or grommet 124 encircles the cylindrical bushing 122 of the spindle 104 and seals the aperture 120. A cup-shaped retaining washer 126 is provided for the sealing ring 124 and is secured to the pin 104 in any suitable manner such as by welding or the like thus preventing entry of foreign material into the interior of the bore 114.

The lower portion of the spindle or pin 104 is tapered downwardly and inwardly at 128 and terminates in a reduced externally threaded lower end 130. Engaging the flat lower surface of the reduced lower end 130 of the spindle or pin 104 is a cup-shaped washer 132 having a depending peripheral flange 134 engaging and retaining the uppermost convolution of a spiral coil spring 136 which has the lowermost and smaller convolution thereof received in and engaged by the concave surface of a concavo-convexo disk 138 which has the periphery thereof received in a groove 140 in the internal surface of the bore 144 and the lower edge of the housing 112 is rolled or deformed inwardly as at 142 thus locking the disk 138 in place for retaining the spring 136 compressed so that the cup-shaped washer 132 will be urged into engagement with the lower end of the spindle or pin 104 to urge the spindle or pin 104 upwardly in relation to the housing 112 or force the housing 112 downwardly in relation to the spindle 104. A suitable lubrication fitting 144 extends through the center of the disk 138 and is secured thereto in a conventional manner such as by a screw-threaded fitting.

Mounted on the spindle 104 is a tubular sleeve 146 having a central cylindrical exterior surface 148 and an inwardly and upwardly tapering exterior surface portion 150 at the upper end thereof and a downwardly and outwardly tapering exterior surface portion 152 at the lower portion thereof as illustrated in FIGURES 5 and 6. The interior of the sleeve 146 is provided with a cylindrical bore or surface area 154 at the upper end portion thereof and an inwardly tapering bore or internal surface 156 at the lower portion thereof as illustrated in FIGURE 5. The lower end of the sleeve 146 is provided with an annular recess 158 surrounding the lower end of the tapered bore surface 156 for receiving a polygonal retaining nut 160 screw-threaded onto the screw-threaded lower end 130 of the spindle 134. The nut 160 is provided with the usual notches 162 in the outer end portion thereof for receiving a retaining pin 164 in the form of a conventional cotter pin, or the like. As illustrated in FIGURE 5, the inner axial surface defining the recess 158 is disposed below the lower end of the tapered portion 128 of the spindle 104 so that the retaining nut 160 will urge the sleeve 146 upwardly so that the coacting tapered surface 128 on the spindle 104 and tapered bore 156 will securely and positively lock the sleeve 146 to the spindle 104 so that the sleeve 146 and spindle 104 will, in effect, become integral and in rigid fixed relationship to each other. As illustrated in FIGURE 5, the upper end of the sleeve 146 is spaced slightly below the flange or lip 118 and the lower end of the sleeve 146 is spaced above the washer 132 and the nut 160 when in retaining position is also spaced from the washer 132 so that the washer 132 will effectively engage the lower end of the spindle 104.

Interposed between the sleeve 146 and the bore 114 and specifically the inwardly tapering surface 116 at the upper end thereof is an upper wedge element 166 having an external surface 168 which tapers downwardly and outwardly and coacts with the tapered surface 116 in the bore 114. The inner surface 170 of the upper wedge element 166 is also tapered downwardly and outwardly and coacts with the tapered surface 150 at the upper end of the sleeve 146. As illustrated, the upper wedge element 166 is a continuous annular member but the upper wedge element may also be constructed of three arcuate segments each of which is in the form of an arcuate wedge element.

Engaging the lower surface of the upper wedge element 116 is an annular washer 172 having an internal diameter 174 slightly greater than the cylindrical portion 148 of the sleeve 146 and also the external diameter thereof is slightly less than the diameter of the bore 114 so that the annular washer 172 may engage the lower end of the wedge element 166. Engaging the washer 172 is a coil compression spring 176 which is disposed in the space between the cylindrical surface 148 of the sleeve 146 and the internal surface of the bore 114 and the lower end of the spring 176 engages an annular washer 178 having an internal diameter 180 slightly greater than the diameter of the lower end portion of the cylindrical portion 148 of the sleeve 146 and an external diameter less than the bore 114 so that the washer 178 may move in the annular space between the sleeve 146 and the bore 114. Disposed below and engaged by the washer 178 is a lower wedge element generally designated by the numeral 182 which is in the form of a plurality of arcuate segments each of which is a wedge element and each segment is designated by numeral 184. Each of the segments 184 of the wedge element 182 is provided with a cylindrical external surface 186 which coacts with the cylindrical internal bore 114 of the housing 112. The inner surface of each arcuate segment 184 of the lower wedge element 182 is downwardly and outwardly tapered at 188 for coacting with the downwardly and outwardly tapering surface 152 on the spindle 146 as illustrated in FIGURE 5.

The relationship of the strength characteristics of the springs in this embodiment is the same as that in FIGURES 1–3 with the spring 136 being relatively strong or high tension while the spring 176 is relatively weak or low tension with the spring 136 serving to urge the housing 112 downwardly in relation to the spindle 104 and in relation to the sleeve 146 which is rigidly fixed to the spindle and the spring 176 serving to retain the wedge elements 166 and 182 seated in relation to the bore so that a bearing surface will be formed to enable relative movement between the external tapered surfaces 150 and 152 of the sleeve and the internal tapered surfaces 170 and 188 of the upper wedge element 166 and lower wedge element 182 respectively with the wedge elements being constructed of sintered bronze material or the like. Also, in a manner similar to that illustrated in FIGURES 1–3, the structure of this embodiment of the invention may also be employed at the relay end of the idler arm to connect the relay end of the idler arm to the cross link of the steering linkage of an automotive vehicle.

Referring now specifically to FIGURES 7–9 of the drawings, the pivotal connection disclosed therein is generally designated by numeral 200 and is for the purpose of pivotally supporting the idler arm 202 from the spindle or pin 204 which has an attaching strap or bracket 206 attached to a component of the vehicle frame 208 by suitable bolts or other fasteners 210.

The anchor end of the idler arm 202 is provided with an integral enlargement or housing 212 which has a cylindrical bore 214 communicating with the lower end of the housing 212. Inwardly of the cylindrical bore portion 214, there is an inwardly and upwardly tapering bore portion 216 which merges with a centrally disposed cylindrical bore portion 218 which is smaller in diameter than the bore portion 214. At the upper end of the cylindrical bore portion 218, there is an upper inwardly and upwardly tapering bore portion 220 and the upper end of the housing 212 is provided with an inturned flange or lip 222 terminating in an opening or aperture 224 receiving a cylindrical portion 226 of the spindle 204. A seal ring or grommet 228 is provided against the upper surface of the flange 222 in sealing relation to the cylindrical portion 226 of the spindle 204 and a cup-shaped retaining washer 230 is provided to seal the opening 224.

The lower end of the cylindrical portion 226 of the spindle 204 is substantially flat and is engaged by a flat cup-shaped washer 232 having a downturned flange 234 receiving the uppermost convolution of a spiral coil spring 236. The lowermost or smallest convolution of the spring 236 is engaged with the concave surface of a concavo-convexo detaining disk 238 which has the periphery thereof received within a groove 240 in the bore portion 214. The lower end of the housing 212 is rolled inwardly or otherwise deformed as at 242 for retaining the retaining disk 238 in position in closed relationship to the lower end of the bore 214 thus retaining the spring 236 in compressed condition and sealing the interior of the housing 212. A suitable conventional lubrication fitting 244 is provided in the disk 238 and is secured thereto in any suitable manner such as by a screw-threaded connection or the like.

Interposed between the cylindrical portion 226 of the spindle 204 and the tapered bore portion 220 is an upper wedge element 246 in the form of three arcuate segments 248 each of which are wedge shaped and cooperate to form a wedge element. The external surface of each segment 248 is tapered downwardly and outwardly as designated by numeral 250 to coact with the upwardly and inwardly tapering surface of the tapered bore portion 220 as illustrated in FIGURE 8. The internal surface 252 of each arcuate segment 248 is cylindrical and coacts with the cylindrical surface of the cylindrical portion 226 of the spindle 204.

Engaged with the undersurface of the upper wedge element 246 is an annular washer 254 having an internal diameter 256 slightly greater than the external diameter of the cylindrical portion 226 of the spindle 204 and an external diameter slightly less than the internal diameter of the cylindrical bore portion 218. A coil compression spring 258 engages the washer 254 and is disposed in the annular space between the cylindrical bore portion 218 and the corresponding portion of the cylindrical lower end 226 of the spindle 204. An annular washer 260 engages the lower end of the spring 258 and has an internal diameter 262 slightly greater than the cylindrical portion 226 of the spindle 204 and slightly less than the cylindrical bore portion 218 as illustrated in FIGURE 8.

Disposed below and engaged by the lower washer 260 is a lower wedge element generally designated by the numeral 264 and constructed in the form of three arcuate segments 266 each of which is wedge shaped and each of which is provided with an external surface 268 which downwardly and outwardly tapers to coact with the downwardly and outwardly tapering lower bore portion 216 in the housing 212. The internal surface 270 of each of the segments 266 is cylindrical for coacting engagement with the cylindrical portion 226 of the spindle 204.

Engaging the lower surface of the segments 266 of the lower edge element 264 is a cup-shaped washer 272 having a depending peripheral flange 274. The flange 274 is spaced inwardly slightly from the cylindrical bore portion 214 at the lower end of the housing 212 and the internal diameter 276 of the washer 272 is slightly spaced from the cylindrical portion 226 of the spindle 204. A substantially C-shaped retaining washer or lockwasher 278 is disposed below the washer 272 and received within the confines of the flange 274. The retaining washer 278 has a lateral opening 280 equal to the diameter of the normally provided opening through the washer 278 thus forming a U-shaped recess having parallel edges opening laterall of the C-shaped washer 278. The edges of the recess including the bight portion thereof is received within a peripheral groove 282 in the cylindrical portion 226 of the spindle 204 thus serving to lock the washer 272 to the spindle 204 thus forming a stationary support for the lower wedge element 264 in relation to the spindle 204. Thus, as the housing 212 is urged downwardly in relation to the spindle 204, the coaction between the tapered outer surface 268 of the segments 266 and the tapered bore portion 216 will retain the segments 266 against the washer 272 and in wear take-up relation to the spindle 204. The spring 258 reacting against the washer 260, lower wedge element 264, washer 272, retaining washer 278 and spindle 204 will urge the upper wedge element 246 upwardly so that the coacting contact between the tapering exterior surface 250 of the segments 248 and the tapering bore portion 220 will automatically compensate for wear and slack take-up between the spindle 204 and the upper wedge element 246 while yet enabling relative rotational as well as axial movement of the idler arm in relation to the frame bracket.

In this embodiment of the invention, it is necessary to employ a segmental wedge element or bearing element in both the upper and lower end of the bore inasmuch as the inside bearing surface where engagement is made with the cylindrical portion 226 of the spindle 204 and where relative rotation occurs is in the form of a straight cylindrical surface and the wedging means or wedging surfaces formed by the tapering surfaces of the segments are located on the outer surface of the wedge elements at both ends of the housing. Also, the spring 236 is a relatively strong spring whereas the spring 258 is a relatively weak spring for retaining the components in place and automatically taking up any slack or wear which may occur. In all embodiments of the invention it is possible to maintain substantially zero clearance on the frame end of the idler arm which is quite important to prevent any up or down play. Of course, the structures may also be employed in the opposite end of the idler arm known as the relay end for connecting the relay end of the idler arm to the cross link of the steering linkage of an automotive vehicle.

Figure 12:
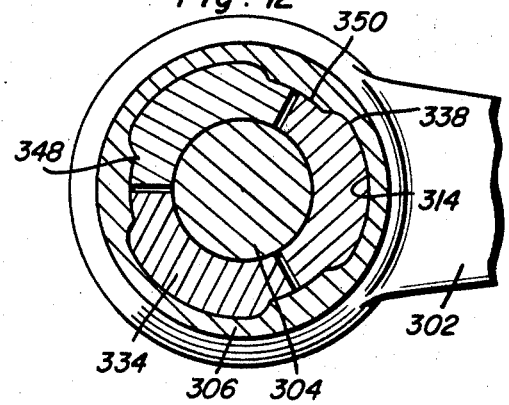
FIGURE 12 is a transverse, sectional view taken substantially upon a plane passing along section line 12—12 of FIGURE 11 illustrating the structural details of the bearing assembly.
Figure 11:
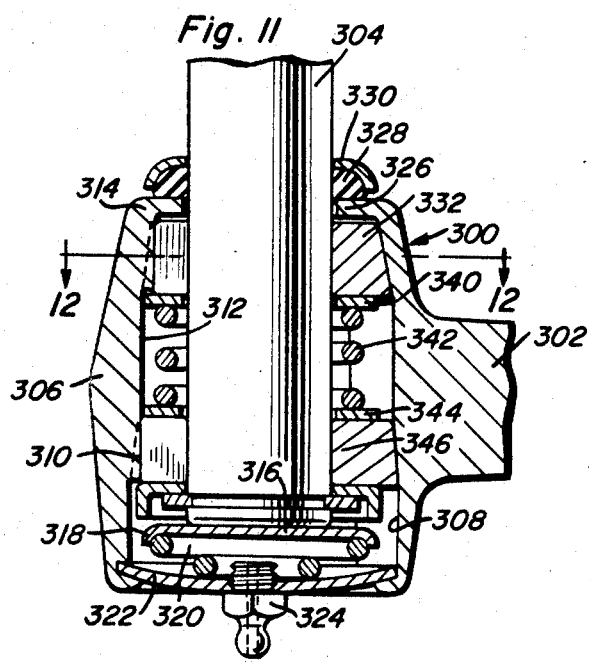
FIGURE 11 is a vertical sectional view of a pivotal connection illustrating an interengaging relationship between the bearing assembly and interior bore in the idler arm housing.
Figure 13:
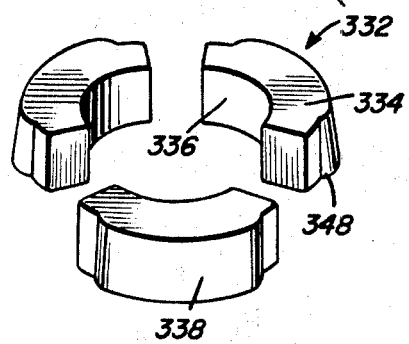
FIGURE 13 is a group perspective view illustrating one of the segmental bearing rings employed in the structure of FIGURES 11 and 12.

Referring now specifically to FIGURES 11-13, the pivotal connection illustrated therein is generally designated by reference numeral 300 and forms a pivotal connection between an idler arm 302 and a cylindrical spindle 304 which corresponds to the spindle illustrated in FIGURES 7-9. The end of the idler arm 302 is provided with a housing 306 having a bore extending therethrough with the bore having a lower portion 308 having side walls parallel to the peripheral surface of the cylindrical spindle 304, a lower upwardly and inwardly tapering portion 310 in which the peripheral surface converges towards the surface of the cylindrical spindle 304, a central bore portion 312 having a peripheral surface parallel to but spaced from the corresponding cylindrical surface of the cylindrical spindle 304 and an upper tapered bore portion 314 which has an upwardly and inwardly tapering surface converging upwardly in relation to the cylindrical surface of the cylindrical spindle 304.

The lower end of the spindle 304 is flat and engaged by a cup-shaped washer 316 having a depending flange 318 which engages and retains the upper end of a relatively strong spiral coil spring 320 which is retained in place by a retaining disk 322 provided with a lubrication fitting 324. This portion of the structure is comparable to the washer, spring and retainer disk assembly illustrated in FIGURES 7-9. The upper end of the housing 302 is provided with an inwardly extending flange 326, a seal ring 328 and a retaining washer 330 comparable to the sealing ring and related structure illustrated in FIGURES 7-9.

Interposed between the cylindrical spindle 304 and the tapered bore portion 314 is an upper wedge element 332 in the form of three arcuate segments 334 having a cylindrical internal surface 336 cooperating with and engaging the cylindrical surface of the spindle 304. The external surface of each of the arcuate segments 336 is downwardly and outwardly tapered as indicated by numeral 338 for coacting engagement with the tapering bore portion 314 of the housing 306. A washer 340 engages the lower surface of the upper wedge element 332 and a relatively weak compression coil spring 342 engages the washer 340 and the lower end thereof engages a similar washer 344 which engages the upper surface of the lower wedge element 346 which is three arcuate segments having the cylindrical inner surface and the external downwardly and outwardly tapering surface similar to the surface 338. The external surface of each of the segments has a recess as at 348 at each end thereof to, in effect, form a segment having two radial dimensions from the inner surface to the outer surface thereof with the greater radial dimension being between the recessed surface areas on the exterior thereof and the lesser radial dimension being at each end of each segment where the recesses 348 are formed. Correspondingly, the bore portions 314 and 310 have radially inwardly projecting areas 350 which interengage with the recesses 348, with the recesses 348 and projecting areas 350 having cylindrical surfaces paralleling the axis of the spindle 304 so that the coacting relationship is such that rotation of the wedge elements is prevented while axial movement is permitted. This construction enables the housing 306 to be extruded rather than being formed by a machining operation which enables the cost to be maintained at a very low level while retaining all of the functions of the connection.

In addition to the lubrication fittings, lubricating passageways may be employed and various metals may be employed in constructing the wedge elements or bearing assemblies including various types of powdered metals and the like. The resilient springs in each instance serve to take up wear between the cooperating bearing surfaces and at the same time enables limited relative longitudinal movement between the components to absorb shock loads imparted to the components while providing substantially free relative rotation between the idler arm and spindle or pin without any binding action.

The tapered sleeve illustrated in FIGURES 4–6 enables a producer to work in relatively close quarters. With the removable sleeve, it can be made in any diameter and can be heat treated without disturbing the heat treatment or other characteristics of the spindle and frame bracket inasmuch as the material of the sleeve may be different and heat treated differently than the spindle or stud on the frame bracket.

The use of the single tapered surface on the pin or spindle which may be considered a diametrically varying surface on the male member facilitates the manufacture of the pin inasmuch as it may be constructed by employing a cold heading procedure which will form a conical or tapering surface of sufficient precision to eliminate finish grinding of the pin. This arrangement also eliminates the problem of the bearing surfaces binding or jamming since the longitudinal axis of the pin will form the axis of the bearing contact or surfaces. The use of the heavy or strong spring and the light or weak spring enables independent loading of the housing in relation to the spindle or pin and the bearing elements or wedge elements in relation to housing and spindle.

What is claimed as new is as follows:

1. A pivotal connection for a steering linkage idler arm comprising at the end of the arm
    (1) a housing having a bore with, axially spaced, cylindrical surface and a diametrical varying surface;
    (2) a spindle including a pin extending axially into said bore;
    (3) first wedge means having an exterior surface in rotatably fixed wedging contact with the diametrical varying surface of said bore and rotatably supporting said pin;
    (4) second wedge means axially spaced from said first wedge means and in rotatably fixed contact with said bore and rotatably supporting said pin, said wedge means including substantially frusto-conical surfaces complementarily mating with said pin and bore;
    (5) resilient means continuously urging relative movement between the frusto-conical surfaces thereby eliminating looseness caused by wear, imprecision and shock loads, said pin received in said bore being provided with a cylindrical external surface, said first wedge means having a cylindrical inner surface in bearing contact with the cylindrical pin, said second wedge means having a cylindrical inner surface in bearing contact with said pin, said bore in said housing having a second diametrically varying surface spaced axially from the first-mentioned diametrically varying surface, said second wedge means having a diametrically varying external surface in fixed wedging contact with the second diametrically varying surface in the bore, each of said wedge means including a plurality of arcuate segments with each segment having a cylindrical inner surface and a diametrically varying outer surface.

2. The structure as defined in claim 1 wherein each of the arcuate segments has a recess in the exterior surface thereof at each end edge thereof whereby the end edges of each arcuate segment are of less thickness than the central portion thereof, said bore in the housing having a corresponding shape to rotatably fixedly receive the segments to eliminate relative rotation between the wedge means and the diametrically varying surfaces of the bore.

3. A steering linkage idler arm comprising at the end;
    (1) a housing having an axial bore with a cylindrical surface and a varying tapering surface axially spaced therein;
    (2) a spindle including a pin means extending into said bore and including a bearing surface spaced radially from the interior of the bore;
    (3) a pair of axially spaced wedge means;
    (4) said wedge means being biased into contact with the bearing surface on the pin means and contact with the surfaces in the bore;
    (5) spring means biasing the wedge means into operative position; and
    (6) at least one of said wedge means being in the form of a plurality of arcuate segments with each segment defining a wedge element, each arcuate segment having an axial projection on the outer surface, said axial projection extending circumferentially over a major portion of the outer surface of the segment, said bore having corresponding recesses to interengage with the projections to rotatively fix the wedge elements with respect to the housing.

References Cited

UNITED STATES PATENTS

| | | | |
|---|---|---|---|
| 1,232,714 | 3/1917 | Olson | 308—71 |
| 1,768,460 | 6/1930 | Boden | 308—71 |
| 2,418,219 | 4/1947 | Bley | 308—70 |
| 2,719,064 | 9/1955 | Barnard | 308—70 |
| 3,044,798 | 7/1962 | Gerner | 280—95 |
| 3,319,098 | 5/1967 | Hartman | 308—70 X |
| 3,361,459 | 1/1968 | Marquis et al. | 308—71 X |
| 3,369,848 | 2/1968 | Gerner | 308—71 |

FOREIGN PATENTS

| | | |
|---|---|---|
| 111,900 | 6/1924 | France. |
| 1,026,004 | 4/1966 | Great Britain. |

WENDELL E. BURNS, *Primary Examiner.*

U.S. Cl. X.R.

287—93; 280—95